(12) United States Patent
Bian et al.

(10) Patent No.: US 11,609,393 B1
(45) Date of Patent: Mar. 21, 2023

(54) OPTICAL COUPLERS INCLUDING A BACK-END-OF-LINE GRATING

(71) Applicant: GLOBALFOUNDRIES U.S. Inc., Malta, NY (US)

(72) Inventors: Yusheng Bian, Ballston Lake, NY (US); Roderick A. Augur, Saratoga Springs, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/475,689

(22) Filed: Sep. 15, 2021

(51) Int. Cl.
*G02B 6/42* (2006.01)

(52) U.S. Cl.
CPC ......... *G02B 6/4213* (2013.01); *G02B 6/4283* (2013.01)

(58) Field of Classification Search
CPC ............................ G02B 6/4283; G02B 6/4213
See application file for complete search history.

(56) References Cited

U.S. PATENT DOCUMENTS

| 9,599,781 B1 | 3/2017 | Skogen et al. |
| 10,690,845 B1 | 6/2020 | Jacob et al. |
| 10,942,321 B1 | 3/2021 | Chandran et al. |

FOREIGN PATENT DOCUMENTS

CN 102650708 A * 8/2012

OTHER PUBLICATIONS

Yusheng Bian et al., "Optical Components in the Back-End-Of-Line Stack of a Photonics Chip", filed Dec. 31, 2021 as U.S. Appl. No. 17/146,864.
Yusheng Bian et al., "Wavelength-Division Multiplexing Filters Including Assisted Coupling Regions", filed Mar. 16, 2021 as U.S. Appl. No. 17/202,729.
Alec Hammond et al., "Perforated Wavelength-Division Multiplexing Filters", filed Feb. 8, 2021 as U. S. U.S. Appl. No. 17/170,203.
J. Yao et al., "Grating-coupler based low-loss optical interlayer coupling," 8th IEEE International Conference on Group IV Photonics, 2011, pp. 383-385.
Folkert Horst, William M.J. Green, Solomon Assefa, Steven M. Shank, Yurii A. Vlasov, and Bert Jan Offrein, "Cascaded Mach-Zehnder wavelength filters in silicon photonics for low loss and flat pass-band WDM (de-) multiplexing," Opt. Express 21, 11652-11658 (2013).

(Continued)

*Primary Examiner* — Sung H Pak
(74) *Attorney, Agent, or Firm* — Thompson Hine LLP; Anthony Canale (57) ABSTRACT

Structures including an optical coupler and methods of fabricating a structure including an optical coupler. The structure includes a substrate, a first dielectric layer on the substrate, and an optical coupler having a first grating and a second grating. The first grating has a first plurality of segments positioned in a first level over the first dielectric layer. The second grating has a second plurality of segments positioned in a second level over the first dielectric layer. The second level differs in elevation above the first dielectric layer from the first level. The second plurality of segments are positioned in the second level to overlap with the first plurality of segments of the first grating, and the second plurality of segments comprise a metal. A second dielectric layer is positioned in a vertical direction between the first level and the second level.

20 Claims, 8 Drawing Sheets

(56) References Cited

OTHER PUBLICATIONS

T. A. Huffman, G. M. Brodnik, C. Pinho, S. Gundavarapu, D. Baney and D. J. Blumenthal, "Integrated Resonators in an Ultralow Loss Si3N4/SiO2 Platform for Multifunction Applications," in IEEE Journal of Selected Topics in Quantum Electronics, vol. 24, No. 4, pp. 1-9, Jul.-Aug. 2018, Art No. 5900209.

Ekmel Ozbay "Plasmonics: Merging Photonics and Electronics at Nanoscale Dimensions" SCIENCE, Jan. 13, 2006, vol. 311, Issue 5758, pp. 189-193.

Nikolajsen et al., "Surface plasmon polariton based modulators and switches operating at telecom wavelengths", Appl. Phys. Lett. 85, 5833 (2004).

Yu et al., "Ultralow-Loss CMOS Copper Plasmonic Waveguides", Nano Lett., 2016, 16, 1, 362-366.

Ropers et al., "Grating-Coupling of Surface Plasmons onto Metallic Tips: A Nanoconfined Light Source" Nano Lett. 2007, 7, 9, 2784-2788.

Y. Bian, J. Ayala, C. Meagher, B. Peng, M. Rakowski, A. Jacob, K. Nummy, A. Sticker, Z. Sowinski, A. Sahin, A. Aboketaf, S. Hu, I. Stobert, K. Mclean, L. Medina, K. Dezfulian, B. Harris, S. Krishnamurthy, T. Houghton, W. S. Lee, M. Sorbara, D. Riggs, T. Letavic, A. Yu, K. Giewont, and J. Pellerin, "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.

M. Rakowski, C. Meagher, K. Nummy, A. Aboketal, J. Ayala, Y. Bian, B. Harris, K. Mclean, K. McStay, A. Sahin, L. Medina, B. Peng, Z. Sowinski, A. Stricker, T. Houghton, C. Hedges, K. Giewont, A. Jacob, T. Letavic, D. Riggs, A. Yu, and J. Pellerin, "45nm CMOS—Silicon Photonics Monolithic Technology (45CLO) for next-generation, low power and high speed optical interconnects," in Optical Fiber Communication Conference (OFC) 2020, OSA Technical Digest Optical Society of America, 2020), paper T3H.3.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Y. Bian et al., "Monolithically integrated silicon nitride platform," 2021 Optical Fiber Communications Conference and Exhibition (OFC), 2021, pp. 1-3.

S. Sun, A. A. Badawy, V. Narayana, T. El-Ghazawi and V. J. Sorger, "The Case for Hybrid Photonic Plasmonic nterconnects (HyPPIs): Low-Latency Energy-and-Area-Efficient On-Chip Interconnects," in IEEE Photonics Journal, vol. 7, No. 6, pp. 1-14, Dec. 2015, Art No. 4801614.

\* cited by examiner

OPTICAL COUPLERS INCLUDING A BACK-END-OF-LINE GRATING

BACKGROUND

The present invention relates to photonics chips and, more specifically, to structures including an optical coupler and methods of fabricating a structure including an optical coupler.

Photonics chips are used in numerous applications, such as data communication systems and data computation systems. A photonics chip monolithically integrates optical components, such as waveguides, optical switches, couplers, and modulators, and electronic components, such as field-effect transistors, into a unified platform. Among other factors, layout area, cost, and operational overhead may be reduced by the chip-level integration of both types of components.

A photonics chip includes a multilayer stack formed by back-end-of-line processing over the optical components and electrical components. The multilayer stack includes interlayer dielectric layers arranged in different levels and metal wires arranged as interconnects placed in the interlayer dielectric layers. The interlayer dielectric layers provide electrical isolation, and the metal wires are vertically interconnected by vias. Optical couplers may transfer light between gratings. However, conventional optical couplers do not include gratings or waveguides in the multilevel stack. Instead, gratings are formed as optical components during middle-of-line processing and front-end-of-line processing, which are followed by back-end-of-line processing to form the multilayer stack.

Improved structures including an optical coupler and methods of fabricating a structure including an optical coupler are needed.

SUMMARY

In an embodiment of the invention, a structure includes a substrate, a first dielectric layer on the substrate, and an optical coupler including a first grating and a second grating. The first grating has a first plurality of segments positioned in a first level over the first dielectric layer. The second grating has a second plurality of segments positioned in a second level over the first dielectric layer. The second level differs in elevation above the first dielectric layer from the first level. The second plurality of segments are positioned in the second level to overlap with the first plurality of segments of the first grating, and the second plurality of segments comprise a metal. A second dielectric layer is positioned in a vertical direction between the first level and the second level.

In an embodiment of the invention, a structure includes a substrate, a first dielectric layer on the substrate, an optical component, a plasmonic component, and a waveguide core connected to the optical component. The waveguide core is positioned in a first level over the first dielectric layer. The structure further includes a metal interconnect connected to the plasmonic component. The metal interconnect is positioned in a second level over the first dielectric layer, and the second level differs in elevation above the first dielectric layer from the first level. The metal interconnect is aligned to transversely cross over the waveguide core. A second dielectric layer is positioned in a vertical direction between the first level and the second level.

In an embodiment of the invention, a method of forming an optical coupler is provided. The method includes forming a first grating including a first plurality of segments positioned in a first level over a first dielectric layer, forming a second dielectric layer over the first level, and forming a second grating including a second plurality of segments positioned in a second level over the first dielectric layer. The first dielectric layer is positioned on a substrate, the second level differs in elevation above the first dielectric layer from the first level, the second dielectric layer is positioned in a vertical direction between the first level and the second level, the second plurality of segments are positioned in the second level to overlap with the first plurality of segments of the first grating, and the second plurality of segments comprise a metal.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
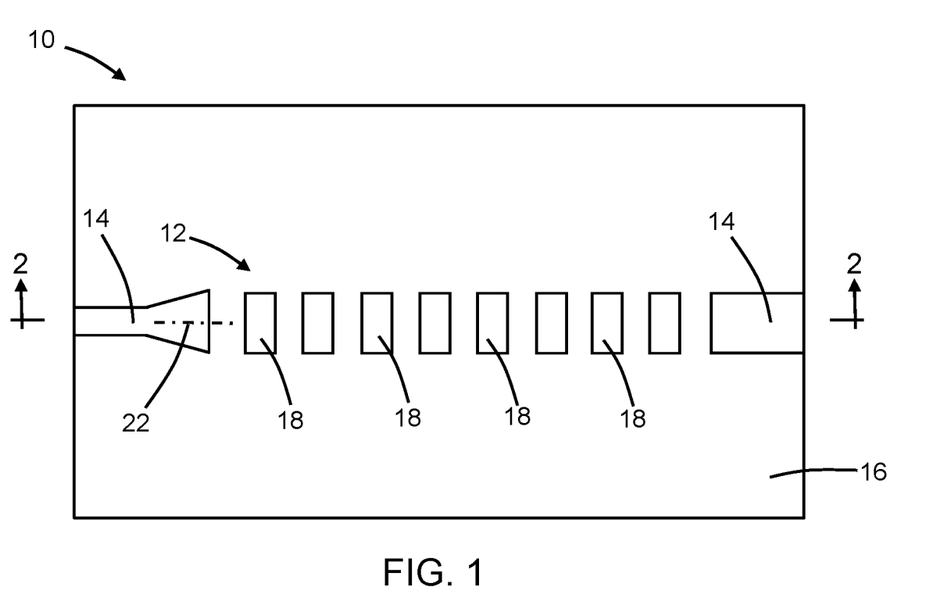
FIG. 1 is a top view of a structure at an initial fabrication stage of a processing method in accordance with embodiments of the invention.
Figure 2:
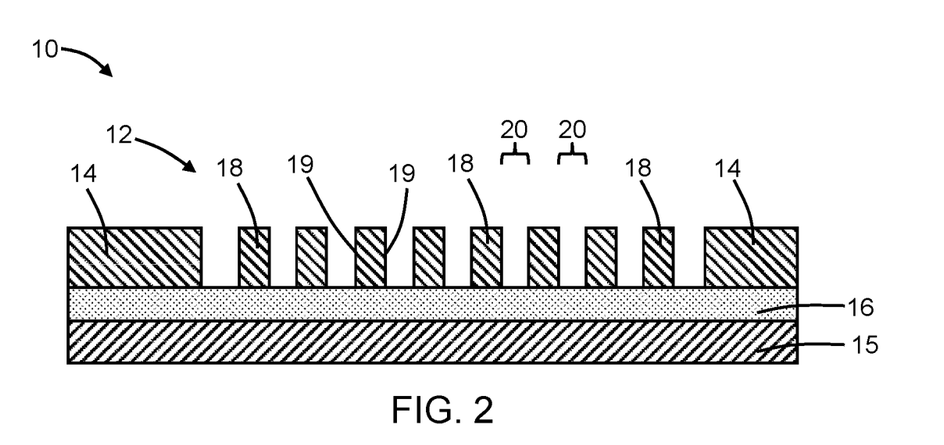
FIG. 2 is a cross-sectional view of the structure taken generally along line 2-2 in FIG. 1.

With reference to FIGS. 1, 2 and in accordance with embodiments of the invention, a structure 10 for a multilayer optical coupler includes a grating 12 and a waveguide core 14 that is adjacent to the grating 12. The grating 12 and waveguide core 14 are positioned on, and in a vertical direction over, a dielectric layer 16. In an embodiment, grating 12 and waveguide core 14 may directly contact the dielectric layer 16.

The grating 12 may include grating structures or segments 18 that are separated by grooves 20. The waveguide core 14 may be aligned with a longitudinal axis 22, and the segments 18 may have sidewalls 19 that are spaced apart by the grooves 20 along the longitudinal axis 22. In an embodiment, the segments 18 may be spaced with a uniform pitch and a uniform duty cycle to define a periodic arrangement. In an alternative embodiment, the segments 18 may be spaced with a non-uniform pitch and/or a non-uniform duty cycle to define an apodized (i.e., aperiodic) arrangement. In the representative embodiment, the sidewalls 19 of the segments 18 may be planar. In an alternative embodiment, the sidewalls 19 of the segments 18 may be non-planar. In an alternative embodiment, the sidewalls 19 of the segments 18 may be curved arcs.

The grating 12 and the waveguide core 14 may be comprised of the same material. In an embodiment, the grating 12 and waveguide core 14 may be comprised of a non-metal material. In an embodiment, the grating 12 and waveguide core 14 may be comprised of a material that is a dielectric material or a semiconductor material. In alternative embodiments, the grating 12 and waveguide core 14 may be comprised of a different type of non-metal material, such as a dielectric material that is an electrical insulator like silicon nitride, silicon oxynitride, or aluminum nitride.

In the representative embodiment, the grating 12 and waveguide core 14 may be comprised of a semiconductor material, such as single-crystal silicon. In an embodiment, the semiconductor material may originate from a device layer of a silicon-on-insulator (SOI) substrate that further includes a buried oxide layer comprised of silicon dioxide providing the dielectric layer 16 and a handle substrate 15 comprised of a semiconductor material, such as single-crystal silicon. The grating 12 and waveguide core 14 are positioned in a given level in a vertical direction relative to the dielectric layer 16 and handle substrate 15.

The grating 12 and the waveguide core 14 may be patterned from the semiconductor material of the device layer by lithography and etching processes during front-end-of-line processing of a photonics chip. In an embodiment, the device layer may be fully etched to define the grating 12 and waveguide core 14. Alternatively, the device layer may only be partially etched to define a thinned residual layer on the dielectric layer 16 that is connected to respective lower portions of the segments 18 of the grating 12 and to a lower portion of the waveguide core 14.

Figure 3:
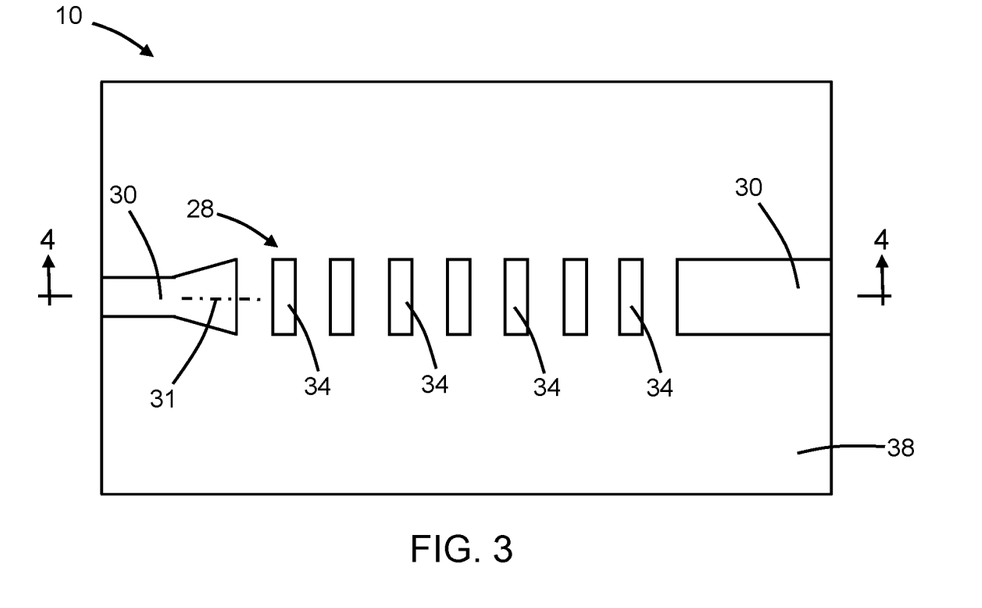
FIG. 3 is a top view of the structure at a fabrication stage subsequent to FIG. 1.
Figure 4:
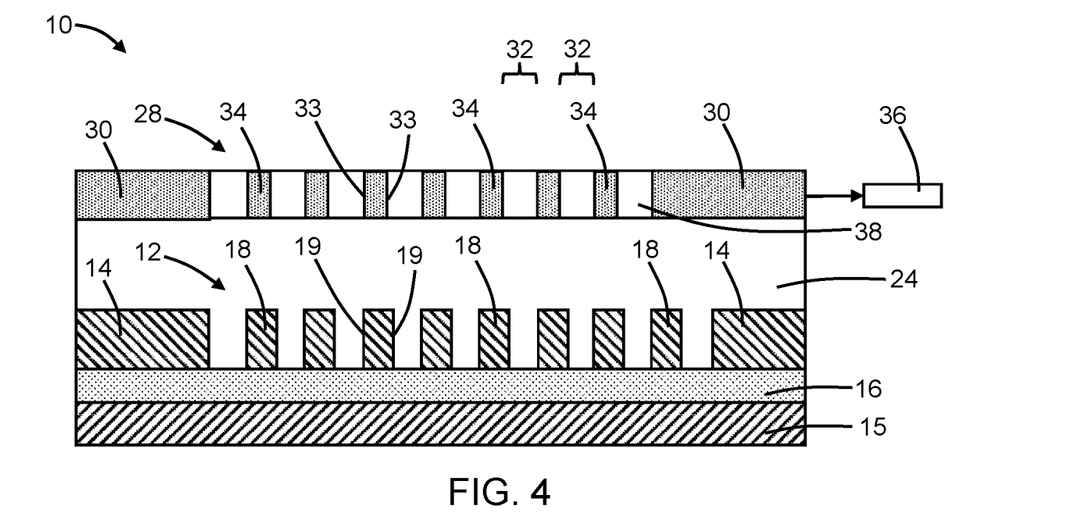
FIG. 4 is a cross-sectional view of the structure taken generally along line 4-4 in FIG. 3.

With reference to FIGS. 3, 4 in which like reference numerals refer to like features in FIGS. 1, 2 and at a subsequent fabrication stage, a dielectric layer 24 is formed over the grating 12 and the waveguide core 14. The dielectric layer 24 is comprised of a dielectric material, such as silicon dioxide, that may be deposited by chemical vapor deposition and planarized by, for example, chemical-mechanical polishing to remove topography. The segments 18 are embedded or buried in the dielectric material of the dielectric layer 24 such that the inter-segment grooves 20 are filled by the dielectric material of the dielectric layer 24.

The structure 10 may further include a grating 28 and a waveguide core 30 that are formed by a back-end-of-line process, such as a damascene process, in a dielectric layer 38 that is included in a back-end-of-line stack formed over the dielectric layer 24. The dielectric layer 38 is comprised of a dielectric material, such as silicon dioxide, that may be deposited by chemical vapor deposition.

The grating 28 and waveguide core 30 may be comprised of a different material than the grating 12 and the waveguide core 14. In an embodiment, the grating 28 and waveguide core 30 may be comprised of a material having a different composition than the material of the grating 12 and waveguide core 14. In an embodiment, the grating 28 may be comprised of a material having a higher electrical conductivity and thermal conductivity than the material of the grating 12. In an embodiment, the grating 28 may be comprised of a metal, such as copper, aluminum, or a different back-end-of-line metal such as titanium nitride. In an embodiment, the grating 28 and the waveguide core 30 may directly contact the dielectric layer 38 to define metal-insulator interfaces.

The grating 28 and waveguide core 30 are plasmonic components that may operate by the mechanism of surface plasmons, which are associated with the collective oscillations of conduction electrons in a metal that propagate in a skin layer along the surface of a metal, such as a metal surface defining an interface with a dielectric material. The waveguide core 30 may couple the grating 28 to plasmonic components 36 that are located on the photonics chip. The plasmonic components 36 may include metal devices for converting polarization, optical filters, etc., as well as logic devices that operate using phase shifts and interference. The waveguide core 30 may be arranged at least in part in an optical path between the grating 28 and the plasmonic components 36.

The dielectric layer 24 is positioned in a vertical direction between (and waveguide core 30) and grating 12 (and waveguide core 14). The grating 28 and waveguide core 30 are positioned in the vertical direction in a different level of the structure 10 than the grating 12 and waveguide core 14 with the dielectric layer 24 intervening between the grating 28 and waveguide core 30. More specifically, the level of the grating 12 and waveguide core 14 and the level of the grating 28 and waveguide core 30 differ in elevation above the dielectric layer 16.

The grating 28 may include grating structures or segments 34 that are separated by grooves 32. Each segment 34 may have a lower surface defining an interface with the dielectric layer 24. The waveguide core 30 may be aligned with a longitudinal axis 31, and the segments 34 may have sidewalls 33 that are spaced apart by the grooves 32 in a direction parallel to the longitudinal axis 31. In an embodiment, the segments 34 of the grating 28 may overlap with the segments 18 of the grating 12. In an embodiment, the segments 34 may be spaced to have a uniform pitch and a uniform duty cycle to define a periodic arrangement. In an alternative embodiment, the segments 34 may be spaced with a non-uniform pitch and/or a non-uniform duty cycle to define an apodized (i.e., aperiodic) arrangement. In the representative embodiment, the sidewalls 33 of the segments 34 may be planar. In an alternative embodiment, the sidewalls 33 of the segments 34 may be non-planar. In an alternative embodiment, the sidewalls 33 of the segments 34 may be curved arcs.

Figure 5:
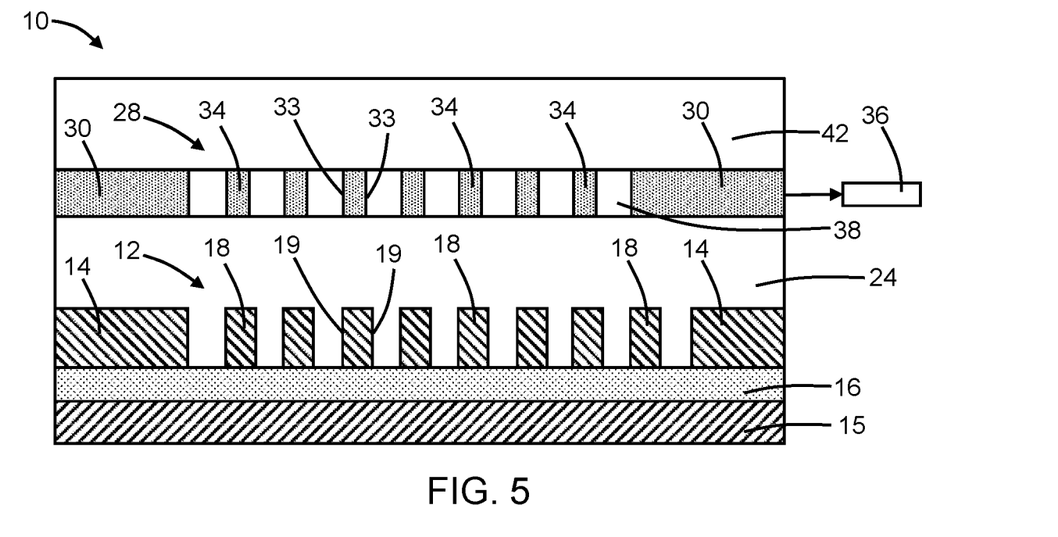
FIG. 5 is a cross-sectional view of the structure at a fabrication stage subsequent to FIG. 4.

With reference to FIG. 5 in which like reference numerals refer to like features in FIG. 4 and at a subsequent fabrication stage, additional dielectric layers 42 of the back-end-of-line stack are formed by back-end-of-line processing over the dielectric layer 24, grating 28, and waveguide core 30. The dielectric layers 42 may be comprised of one or more dielectric materials, such as silicon dioxide, silicon nitride, tetraethylorthosilicate silicon dioxide, fluorinated-tetraethylorthosilicate silicon dioxide, silicon-carbon nitride, and/or hydrogenated silicon-carbon nitride, deposited by, for example, chemical vapor deposition.

In use, light (e.g., laser light) may be guided by the waveguide core 14 from an edge coupler or another grating coupler to the structure 10. The arriving light is transferred upwardly by the optical coupler 10 from the grating 12 to the grating 28 that is located in the back-end-of-line stack. The waveguide core 30, which is also located in the back-end-of-line stack, guides the light away from the grating 28 to the plasmonic components 36 on the photonics chip. The light interacts with electrons in the metal of the grating 28 by a plasmonic mechanism. The strength and efficiency of the optical coupling may be determined by phase matching between the grating 12 and the grating 28. A phase matched condition between the grating 12 and the grating 28 may be established through the selection of the duty cycle of the grating 12 and the duty cycle of the grating 28.

The optical coupler includes gratings 12, 28 containing heterogenous materials that have a multi-level arrangement. The optical coupler may be characterized by efficient coupling and energy transfer between the grating 12 and the grating 28 due at least in part to the material from which the grating 28 is constructed. Consequently, the grating 28 may permit the length of the optical coupler to be reduced, which reduces the form factor of the optical coupler and may promote an increase in the density of optical components on a photonics chip.

The structure 10, in any of its embodiments described herein, may be integrated into a photonics chip that may include electronic components, additional plasmonic components, and additional optical components. The electronic components may include, for example, field-effect transistors that are fabricated by CMOS front-end-of-line processing.

Figure 6:
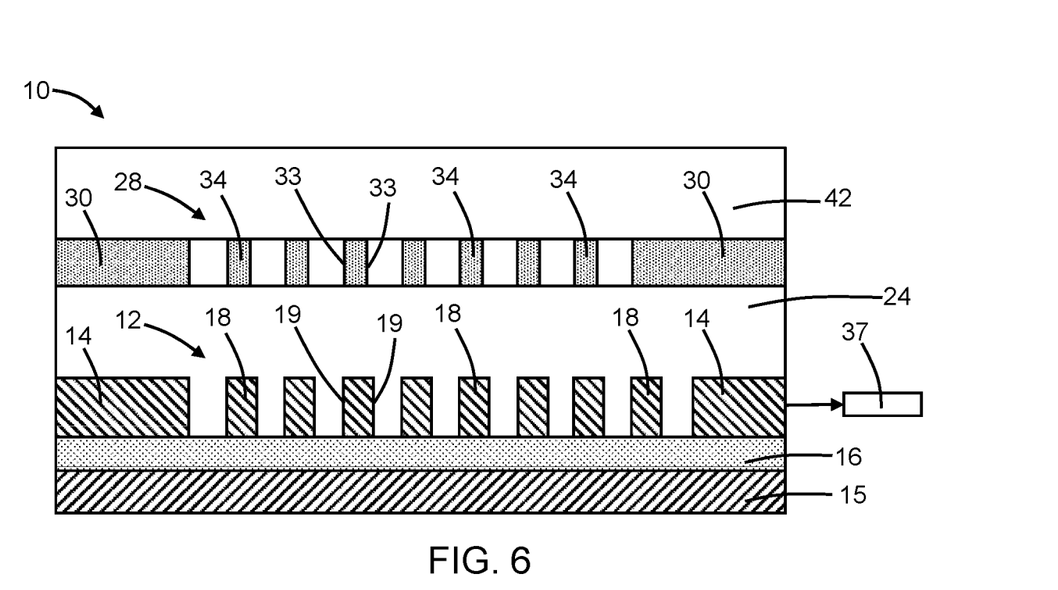
FIG. 6 is a cross-sectional view of a structure in accordance with alternative embodiments of the invention.

With reference to FIG. 6 and in accordance with alternative embodiments of the invention, the waveguide core 14 may be coupled to optical components 37 on the photonics chip instead of, or in addition to, the waveguide core 30. In that regard, the waveguide core 14 may be arranged at least in part in an optical path between the grating 12 and the optical components 37. In use, light is guided by the waveguide core 30 from, for example, an edge coupler or another grating coupler to the structure 10. The arriving light is transferred downwardly from the grating 28 to the grating 12. The waveguide core 14 guides the light away from the grating 28 to the optical components 37 on the photonics chip.

Figure 7:
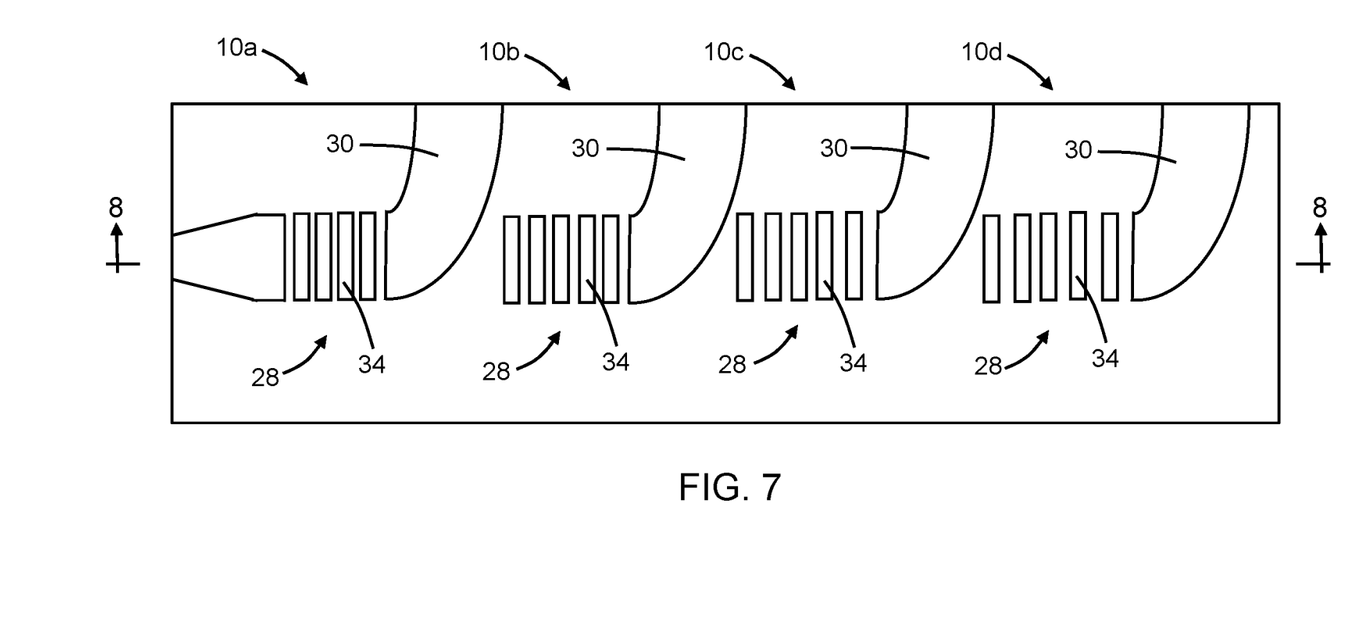
FIG. 7 is a top view of a structure in accordance with alternative embodiments of the invention.
Figure 8:
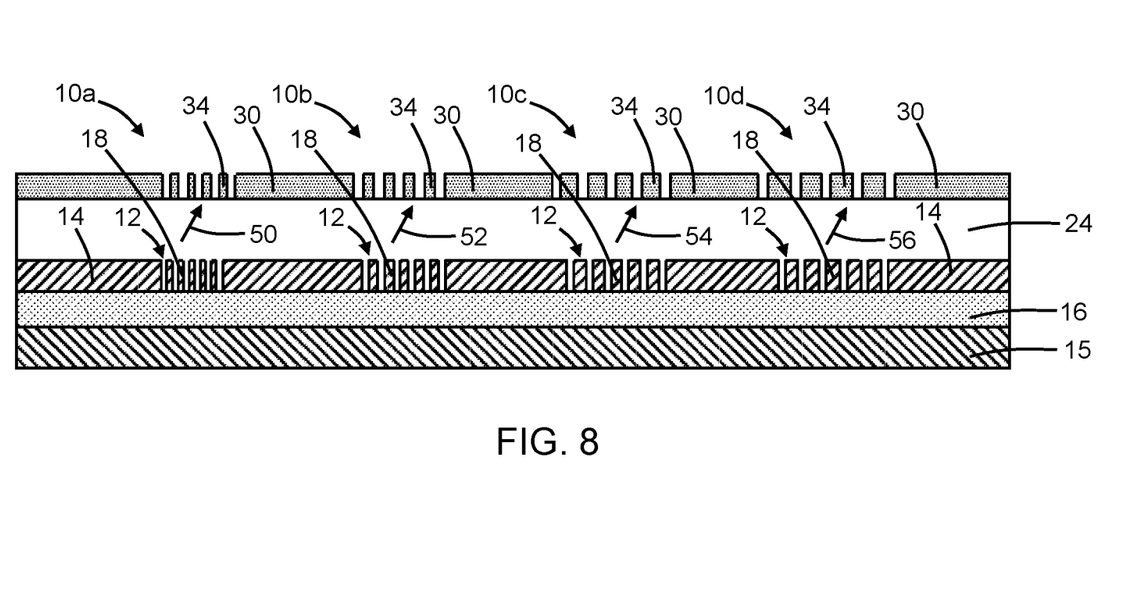
FIG. 8 is a cross-sectional view of the structure taken generally along line 8-8 in FIG. 7.

With reference to FIGS. 7, 8 and in accordance with alternative embodiments of the invention, multiple instances 10a, 10b, 10c, 10d of the structure 10 may be serially arranged to form a vertical wavelength demultiplexer. The waveguide core 30 of each of the instances 10a, 10b, 10c, 10d may include a bend that directs the transferred light away from the vertical wavelength demultiplexer. In that regard, the segments 18 of the grating 12 and the segments 34 of the grating 28 in each of the instances 10a, 10b, 10c, 10d may be configured to transfer light within a specific wavelength band centered about a peak wavelength. For example, the duty cycle of the segments 18 of the grating 12 and the duty cycle of the segments 34 of the grating 28 in each of the instances 10a, 10b, 10c, 10d may be modified to adjust the wavelength band of the transferred light. The number of instances 10a, 10b, 10c, 10d may be equal to the number of different wavelength bands contained in the multiplexed light being guided by the waveguide core 14 for introduction into the vertical wavelength demultiplexer. The number of instances 10a, 10b, 10c, 10d of the structure 10 may vary from the representative number of instances such that either a larger or less number of wavelength bands may be demultiplexed. The waveguide core 14 extends at least in part between the gratings 12 of the different instances 10a, 10b, 10c, 10d.

In use, light of multiple wavelength bands 50, 52, 54, 56 may enter the vertical wavelength demultiplexer via the waveguide core 14 and are separated (i.e., demultiplexed) by the instances 10a, 10b, 10c, 10d of the structure 10. The instance 10a transfers light in wavelength band 50 upward from its grating 12 to its grating 28, and the transferred light in the waveguide band 50 is guided away from the vertical wavelength multiplexer by the bend in the waveguide core 30 of instance 10a. The light in wavelength bands 52, 54, 56 is not transferred by the instance 10a and continues to propagate in the waveguide core 14. The instance 10b transfers light in wavelength band 52 upward from its grating 12 to its grating 28, and the transferred light in the waveguide band 52 is guided away from the vertical wavelength demultiplexer by the bend in the waveguide core 30 of instance 10b. The light in wavelength bands 54, 56 is not transferred by the instance 10b and continues to propagate in the waveguide core 14. The instance 10c transfers light in wavelength band 54 upward from its grating 12 to its grating 28, and the transferred light in the waveguide band 54 is guided away from the vertical wavelength demultiplexer by the bend in the waveguide core 30 of instance 10c. The light in wavelength band 56 is not transferred by the instance 10c and continues to propagate in the waveguide core 14. The instance 10d transfers light in wavelength band 56 upward from its grating 12 to its grating 28, and the transferred light in the waveguide band 56 is guided away from the vertical wavelength demultiplexer by the bend in the waveguide core 30 of instance 10d.

In an alternative embodiment, multiple instances 10a, 10b, 10c, 10d of the structure 10 may be serially arranged to form a vertical wavelength multiplexer that is used to combine light of multiple different wavelengths. In that regard, light of different wavelength bands may be supplied by the waveguide core 30 of each of the instances 10a, 10b, 10c, 10d to the vertical wavelength multiplexer and transferred downwardly by optical coupling between the gratings 12, 28 of each of the instances 10a, 10b, 10c, 10d to provide multiplexed light that is guided away from the vertical wavelength multiplexer by the waveguide core 14.

Figure 9:
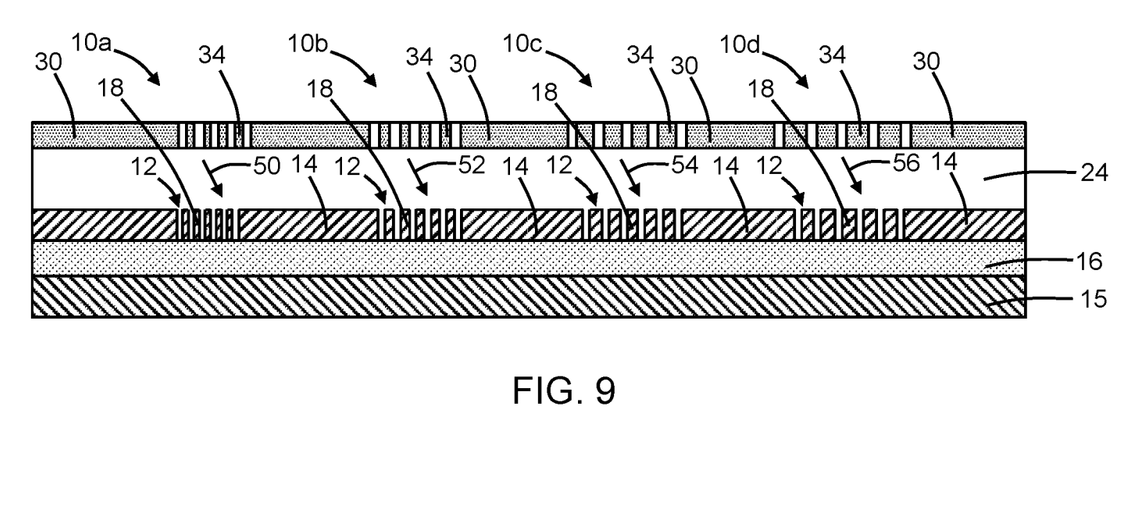
FIG. 9 is a cross-sectional view of a structure in accordance with alternative embodiments of the invention.

With reference to FIG. 9 and in accordance with alternative embodiments of the invention, the multiple instances 10a, 10b, 10c, 10d of the structure 10 may be configured such the waveguide core 30 receives multiplexed light that is demultiplexed and coupled downward by the instances 10a, 10b, 10c, 10d of the structure 10 from the respective grating 28 to the respective grating 12. The transferred light in each of the wavelength bands 50, 52, 54, 56 is guided away from the vertical wavelength demultiplexer by the waveguide core 14 of one of the instances 10a, 10b, 10c, 10d, and each waveguide core 14 may include a bend to similar to the bend illustrated in FIG. 7 for the waveguide cores 30. The waveguide core 30 extends at least in part between the gratings 28 of the different instances 10a, 10b, 10c, 10d.

Figure 10:
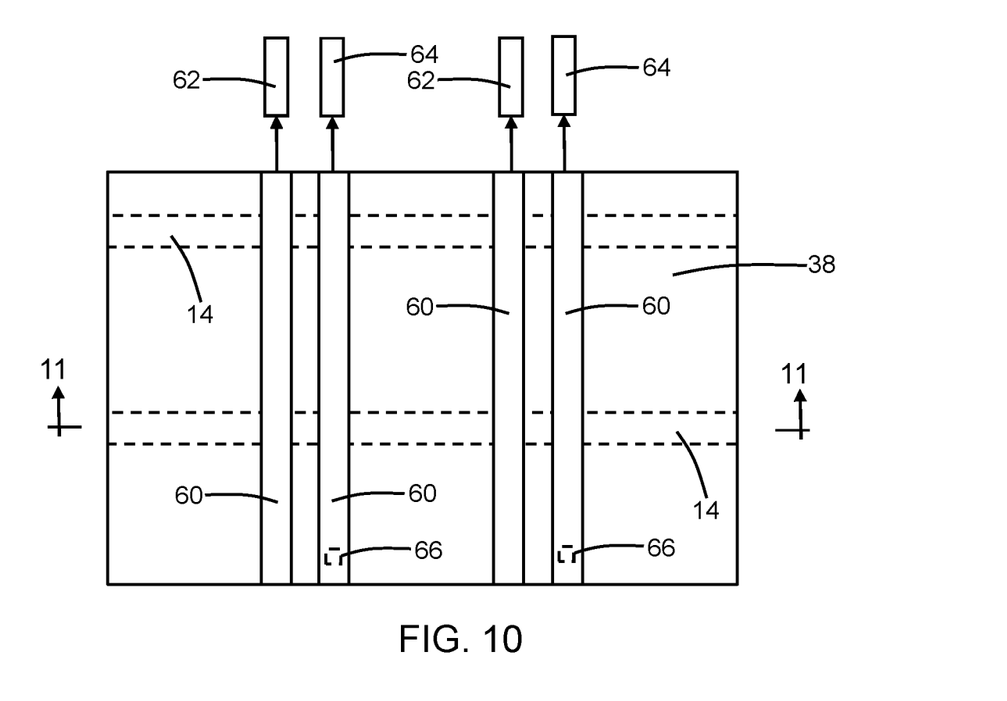
FIG. 10 is a top view of a structure in accordance with alternative embodiments of the invention.
Figure 11:
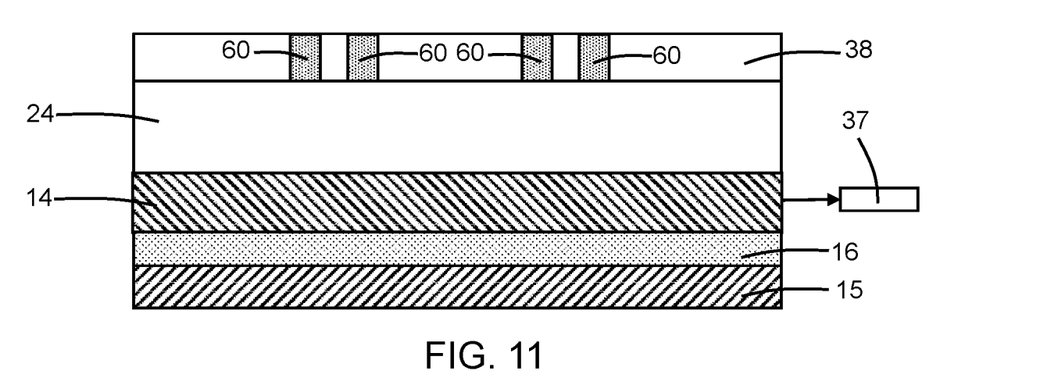
FIG. 11 is a cross-sectional view of the structure taken generally along line 11-11 in FIG. 10.

With reference to FIGS. 10, 11 and in accordance with alternative embodiments of the invention, a photonics chip may include multiple waveguide cores 14 and interconnects 60 that are positioned in the dielectric layer 38 of the back-end-of line stack over the waveguide cores 14. The interconnects 60 may be metal wires of copper, aluminum, or a different back-end-of line metal, that are formed by a damascene process in the dielectric layer 38. In an embodiment, the interconnects 60 may be aligned to transversely cross over the waveguide cores 14. The interconnects 60 may be located in a metallization level of the back-end-of-line stack.

The level of the waveguide cores 14 and the level of the metallization level containing the interconnects 60 differ in elevation above the dielectric layer 16.

The waveguide cores 14 and interconnects 60 may facilitate communications by different channels on the photonics chip. The waveguide cores 14 may guide light on the photonics chip to, and between, the optical components 37 that are located on the photonics chip. The interconnects 60 may be coupled to plasmonic components 62 that are located on the photonics chip and may also be coupled to electronic components 64 that are located on the photonics chip. Vertical interconnects 66 may provide the connections between the interconnects 60 and the electronic components 64. The plasmonic components 62 may include devices for converting polarization, optical filters, etc., as well as logic devices that operate using phase shifts and interference. The interconnects 60 may be configured to guide light on the photonics chip to, and between, the plasmonic components 62 and, in addition, may transfer electrical signals in the form of modulated current between the electronic components 64. The interconnects 60 may guide the light either as surface plasmons or as a slotted waveguide structure. The interconnects 60 may facilitate the simultaneous communication of light and electrical signals on the photonics chip.

The combination of plasmonic components 62 with optical components 37 may boost the system performance by, for example, adding additional freedom for signal multiplexing and extending the wavelength band beyond what is typically used for a photonic system thereby expanding capabilities, such as wavelength-division multiplexing capabilities.

Figure 12:
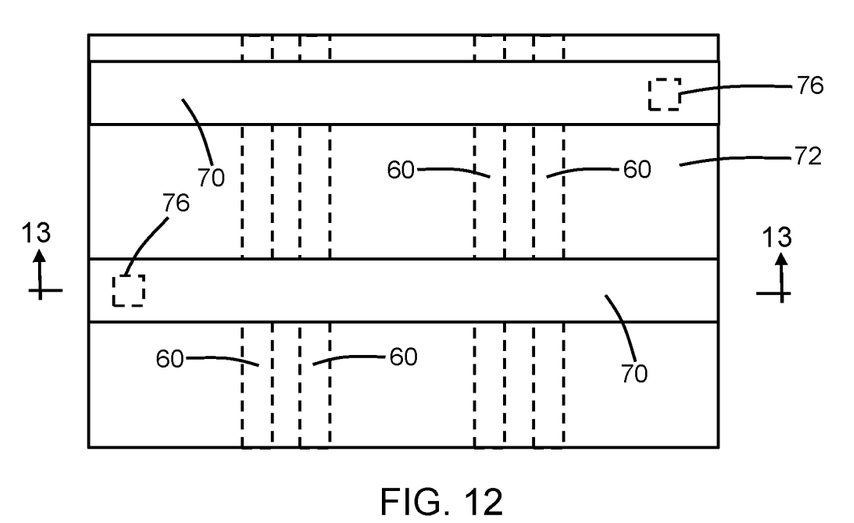
FIG. 12 is a top view of a structure in accordance with alternative embodiments of the invention.
Figure 13:
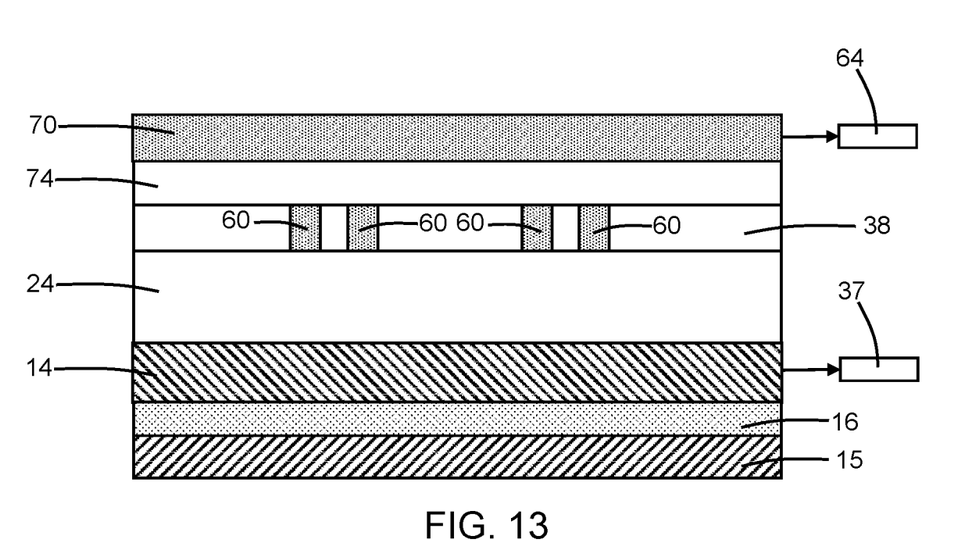
FIG. 13 is a cross-sectional view of the structure taken generally along line 13-13 in FIG. 12.

With reference to FIGS. 12, 13 in which like reference numerals refer to like features in FIGS. 10, 11 and in accordance with alternative embodiments of the invention, interconnects 70 may be located in a metallization level of the back-end-of-line stack that is different from the metallization level containing the interconnects 60. The level of the metallization level containing the interconnects 70 and the level of the metallization level containing the interconnects 60 differ in elevation above the dielectric layer 16.

In the representative embodiment, the interconnects 70 are positioned in a dielectric layer 72 of the back-end-of line stack over the waveguide cores 14 and interconnects 60, and a dielectric layer 74 is arranged in a vertical direction between the interconnects 60 and the interconnects 70. The interconnects 70 may be metal wires comprised of copper, aluminum, etc. that are formed by a damascene process in the dielectric layer 72. In an embodiment, the interconnects 70 may be aligned to transversely cross over the interconnects 60 and may be aligned parallel to the waveguide cores 14. The interconnects 70 are coupled to the electronic components 64 on the photonics chip. Vertical interconnects 76 may provide the connections between the interconnects 60 and the electronic components 64. The interconnects 70 can be configured to transfer electrical signals in the form of modulated current between the electronic components 64 and may be unable to guide light on the photonics chip due to, for example, having a spacing that is greater than the spacing of the interconnects 60.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features overlap if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a substrate;
    a first dielectric layer on the substrate;
    a first optical coupler including a first grating and a second grating, the first grating including a first plurality of segments positioned in a first level over the first dielectric layer, the second grating including a second plurality of segments positioned in a second level over the first dielectric layer, the second level differing in elevation above the first dielectric layer from the first level, the second plurality of segments positioned in the second level to overlap with the first plurality of segments of the first grating, and the second plurality of segments comprising a metal;
    a plasmonic component;
    a first waveguide core in the second level, the first waveguide core arranged at least in part between the plasmonic component and the second grating, and the first waveguide core comprising the metal; and
    a second dielectric layer positioned in a vertical direction between the first level and the second level.

2. The structure of claim 1 wherein the first plurality of segments comprise a non-metal.

3. The structure of claim 1 wherein the metal is copper, aluminum, or titanium nitride.

4. The structure of claim 1 wherein the second plurality of segments are in direct contact with the second dielectric layer, and the second dielectric layer comprises a dielectric material.

5. The structure of claim 4 wherein the first plurality of segments are embedded in the second dielectric layer.

6. The structure of claim 1 further comprising:
an optical component; and
a second waveguide core in the first level, the second waveguide core arranged at least in part between the optical component and the first grating.

7. The structure of claim 1 wherein the first plurality of segments and the second plurality of segments are phase matched to permit light transfer between the first grating and the second grating.

8. The structure of claim 1 wherein the first plurality of segments have a first duty cycle, the second plurality of segments have a second duty cycle that provides a phase matched condition to permit light transfer between the first grating and the second grating, and the second duty cycle differs from the first duty cycle.

9. A structure comprising:
a substrate;
a first dielectric layer on the substrate;
a first optical coupler including a first grating and a second grating, the first grating including a first plurality of segments positioned in a first level over the first dielectric layer, the second grating including a second plurality of segments positioned in a second level over the first dielectric layer, the second level differing in elevation above the first dielectric layer from the first level, the second plurality of segments positioned in the second level to overlap with the first plurality of segments of the first grating, and the second plurality of segments comprising a metal:
a second optical coupler including a third grating and a fourth grating, the third grating including a third plurality of segments positioned in the first level over the first dielectric layer, the fourth grating including a fourth plurality of segments positioned in the second level over the first dielectric layer, the fourth plurality of segments positioned to overlap with the third plurality of segments of the third grating, and the fourth plurality of segments comprising the metal;
a second dielectric layer positioned in a vertical direction between the first level and the second level; and
a first waveguide core extending at least in part from the second plurality of segments to the fourth plurality of segments, the first waveguide core comprised of the metal.

10. The structure of claim 9 further comprising:
a second waveguide core extending at least in part from the first plurality of segments to the third plurality of segments.

11. A structure comprising:
a substrate;
a first dielectric layer on the substrate;
an optical component;
a plasmonic component;
a waveguide core connected to the optical component, the waveguide core positioned in a first level over the first dielectric layer;
a first interconnect connected to the plasmonic component, the first interconnect positioned in a second level over the first dielectric layer, the second level differing in elevation above the first dielectric layer from the first level, the first interconnect aligned to transversely cross over the waveguide core, and the first interconnect comprising a metal; and
a second dielectric layer positioned in a vertical direction between the first level and the second level.

12. The structure of claim 11 further comprising:
an electronic component in the first level,
wherein the first interconnect is connected to the electronic component.

13. The structure of claim 11 further comprising:
a second interconnect connected to the plasmonic component, the second interconnect positioned in the second level adjacent to the first interconnect, and the second interconnect comprising the metal.

14. The structure of claim 1 wherein the first plurality of segments comprise silicon.

15. The structure of claim 9 wherein the first plurality of segments and the third plurality of segments comprise a non-metal.

16. The structure of claim 9 wherein the metal is copper, aluminum, or titanium nitride.

17. The structure of claim 9 wherein the second plurality of segments and the fourth plurality of segments are in direct contact with the second dielectric layer, and the first plurality of segments and the third plurality of segments are embedded in the second dielectric layer.

18. The structure of claim 9 wherein the first plurality of segments and the second plurality of segments are phase matched to permit light transfer between the first grating and the second grating, and the third plurality of segments and the fourth plurality of segments are phase matched to permit light transfer between the third grating and the fourth grating.

19. The structure of claim 9 wherein the first plurality of segments have a first duty cycle, the second plurality of segments have a second duty cycle that provides a phase matched condition to permit light transfer between the first grating and the second grating, and the second duty cycle differs from the first duty cycle.

20. The structure of claim 9 wherein the third plurality of segments have a first duty cycle, the fourth plurality of segments have a second duty cycle that provides a phase matched condition to permit light transfer between the third grating and the fourth grating, and the second duty cycle differs from the first duty cycle.

* * * * *